(12) United States Patent
Goertzen

(10) Patent No.: US 6,532,308 B1
(45) Date of Patent: Mar. 11, 2003

(54) QUALITY PRIORITY IMAGE STORAGE AND COMMUNICATION

(75) Inventor: Kenbe D. Goertzen, Topeka, KS (US)

(73) Assignee: QuVIS, Inc., Topeka, KS (US)

( * ) Notice: Subject to any disclaimer, the term of this patent is extended or adjusted under 35 U.S.C. 154(b) by 0 days.

(21) Appl. No.: 09/498,924

(22) Filed: Feb. 4, 2000

Related U.S. Application Data (60) Provisional application No. 60/118,554, filed on Feb. 4, 1999.

(51) Int. Cl.$^7$ .................................................. G06K 9/36
(52) U.S. Cl. ...................................................... 382/240
(58) Field of Search ................................ 382/232, 236, 382/238, 240, 242, 248, 250; 341/51, 63, 65, 67, 107; 348/384.1, 394.1, 395.1, 400.1–404.1, 407.1–416.1, 420.1–421.1, 425.2, 430, 431; 375/240.02, 240.03, 240.11–240.16, 240.18, 240.19, 240.2, 240.22–240.25; 364/724.011, 724.04, 724.05, 724.13, 724.14, 725.01, 725.02

(56) References Cited

U.S. PATENT DOCUMENTS

| | | | |
|---|---|---|---|
| 5,394,473 A | 2/1995 | Davidson | 381/36 |
| 5,966,465 A | * 10/1999 | Keith et al. | 382/232 |
| 5,990,955 A | * 11/1999 | Koz | 348/390 |

\* cited by examiner

*Primary Examiner*—Jose L. Couso
(74) *Attorney, Agent, or Firm*—Bromberg & Sunstein LLP (57) ABSTRACT

An image processing scheme that minimizes the amount of data required to process an input image signal but which maintains a guaranteed desired image quality level is disclosed. Transformation and quantification removes redundant data from the input image signal and provides a symbol set that is represented by a determined total data content. A peak data rate is determined from the total data content and any encoding overhead. The quality of image processing is determined based upon the transformation and quantification settings. Quality priority processing ensures that the available data rate is at least equal to the peak data rate. Transformation and quantification can be adjusted where a determination is made that the peak data rate exceeds the available data processing rate, or where the determined quality level does not exceed the selected quality level.

8 Claims, 4 Drawing Sheets

QUALITY PRIORITY IMAGE STORAGE AND COMMUNICATION

This application claims benefit of Provisional No. 60/118,554 filed Feb. 4, 1999.

RELATED APPLICATION

The subject matter of this application is related to the subject matter of the following commonly owned applications: Ser. No. 09/112,668, titled "Apparatus And Method For Entropy Coding", filed on Jul. 9, 1998, also by Kenbe Goertzen; Ser. No. 09/498,925, titled "A System And Method For Improving Compressed Image Appearance Using Stochastic Resonance And Energy Replacement", filed concurrently, also by Kenbe Goertzen; Ser. No. 09/498,323, titled "Scaleable Resolution Motion Image Recording And Storage System", filed concurrently, also by Kenbe Goertzen; Ser. No. 09/499,091, titled "Optimized Signal Quantification", filed concurrently, also by Kenbe Goertzen; the contents of which are incorporated by reference as if fully disclosed herein.

BACKGROUND OF THE INVENTION

1. Field of the Invention

This application relates generally to image signal processing, and more particularly to processing image signals in a quality priority operational mode.

2. Description of the Related Art

Typical image compression systems exploit the fact that images stored in the sample domain are almost always undermodulated (or highly autocorrelated) and therefore require significantly more storage than their information content actually requires. These systems have been unable to guarantee a worst case local error, or even a global average error in magnitude resolution at frequency, frequency response, DC accuracy, or any other hard quantification.

There are several methods of specifying a desired image accuracy in the sample domain, including exact n bit, absolute error bound, and peak signal to noise ratio. Each method assumes that the frequency response is unity over the useful passband, and that frequency resolution grows in accordance with sampling theory (3 dB/octive/dimension).

If an image is captured at a very high resolution per pixel, and quantified for storage in the sample domain at some arbitrary resolution, noise must be added at that resolution to linearize the quantification function to assure that adequate low frequency resolution is available. This noise has two undesirable effects. It reduces the resolution at Nyquist frequency to half that implied by the sample resolution, and it introduces noise information into the image which often exceeds the total image information (without the noise).

In the sample domain, the sample resolution is directly proportional to the data throughout rate. Thus, whatever equipment is available at a given cost directly dictates the available resolution. Sample resolution in both frequency and fidelity are therefore typically picked to be just adequate for an application.

Alternative approaches introduce frequency or phase uncertainty. The detailed analysis required in these domains precludes any reasonable quality priority encoding implementation. Other alternatives provide good performance in the right circumstances, but do not perform adequately in certain situations such as when quantification is applied. Vector quantification and fractal transforms are examples that generate phase and frequency domain artifacts which can be extremely difficult or impossible to bound. The RMS error of the vector can in some cases be controlled, but typically the local error bound is not controlled, nor is the worst case phase and frequency artifacts emerging from various two or three dimensional patterns of vectors.

Nonlinear phase transforms and many types of predictive error encoding systems can produce so much phase uncertainty that they are not practical for quality priority encoding. Finally, partial image transforms such as the commonly used 8×8 Discrete Cosine Transform convert any quantification error into localized anomalies in both the spatial and frequency domain, making them unsuitable for quality priority encoding, particularly when quantification is present.

Thus, there remains a need for compressed image signal processing that can operate in a quality priority mode.

SUMMARY OF THE INVENTION

The present invention includes apparatuses and methods for quality priority processing of image signals. Quality can be measured according to the modes of accuracy typically used in the sample domain, and can be guaranteed even as the image signal is processed in the encoded domain. Thus, the typical under-modulation of images is exploited to reduce bandwidth (storage, transmission, or otherwise) while the classical artifacts of image compression are avoided.

By using the quality priority image processing scheme of the present invention, an image can be captured at a very high resolution and stored without dither noise, because the desired low frequency resolutions are maintained directly to meet the requirements of sampling theory. This offers more efficient storage to assure image quality than the sample domain, which is dependent upon the presence, type, and frequency distribution of the linearizing noise. Further, the scheme allows compression without artifacts as only the information in the image is stored, in contrast to sample domain processing where redundant data is retained to ensure integrity.

In one embodiment, the quality priority image processing scheme receives a desired quality level and determines image processing settings for transformation, quantification, and encoding that ensure maintenance of the desired quality level. An input image signal is preferably subdivided in space or time to produce a plurality of subband regions. With quantification, each of these regions has a number of symbols (i.e., the symbol count), with each symbol being represented by a number of bits (i.e., the data size). An array of the data content for each region is determined as the symbol count times the data size for each region. The total data content equals a summation of the entries in the regional data content array.

The data is also encoded after transformation and quantification. While this encoding produces substantial reductions in the overall data content, at maximum entropy the data content for a given symbol can exceed the original data size. This possible excess data content can be referred to as the encoding. overhead. The data content at maximum entropy can be determined based upon the encoding overhead and the total data content. This maximum entropy data content and the desired image processing rate (e.g., images per second) are used to determine the peak data rate required to guarantee the selected quality level.

DETAILED DESCRIPTION OF THE INVENTION

Figure 1:
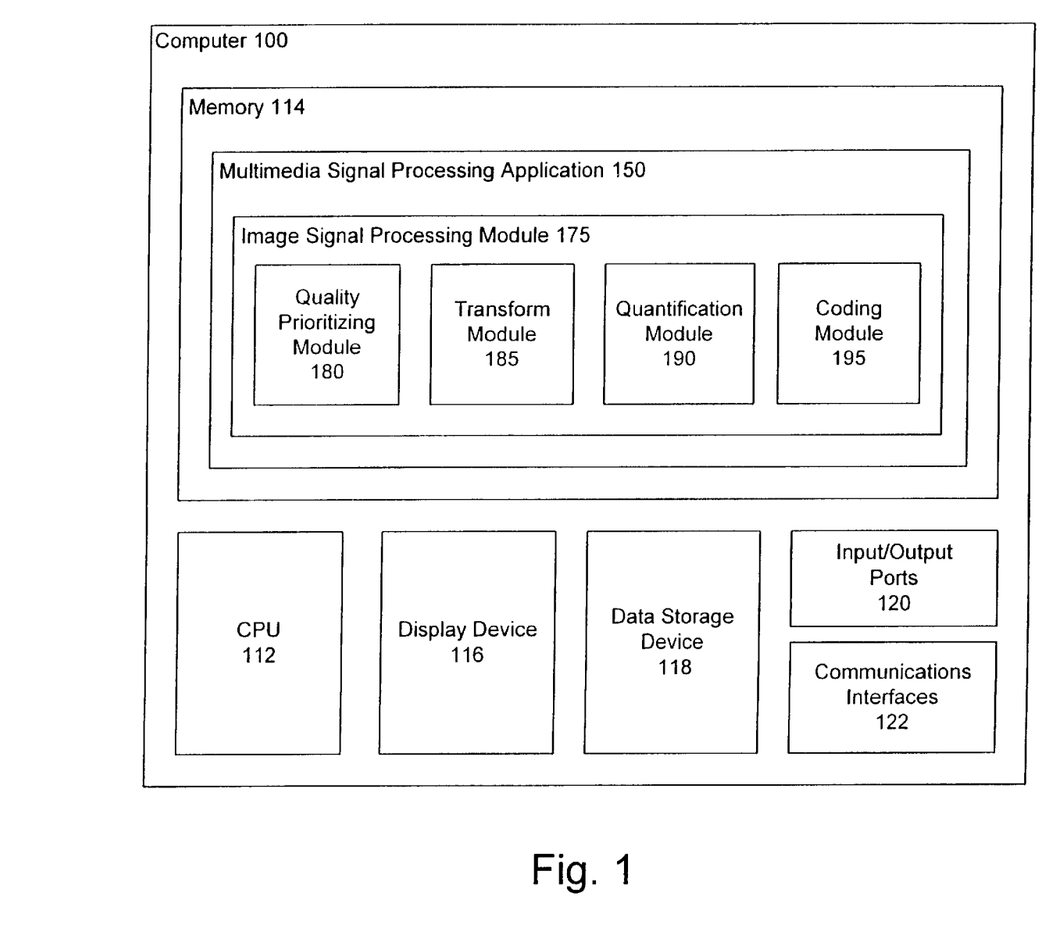
FIG. 1 is a block diagram illustrating a computer including an embodiment of a quality prioritizing module constructed in accordance with the present invention.

Referring now to the block diagram of FIG. 1, a computer 100 incorporating an embodiment of a quality prioritizing module 180 constructed in accordance with the present invention is shown. The computer 100 includes a CPU 112, memory 114, display device 116, data storage device 118, input/output ports 120 and communications interfaces 122. The memory stores information, such as instructions and data. The CPU 112 is arranged to execute instructions, such as those stored in memory 114. The display device 116 provides a visual output, the input/output ports 120 allow information to be received and provided between the computer 100 and any peripherals, such as conventional video equipment, and the communications interfaces 122 allow the computer 100 to communicate with other computers.

The memory 114 can be a RAM or any conventional memory for storing information including instructions for execution by the CPU 112. The display device 116 is conventional, such as a CRT, LCD or LED type display. The data storage device 118 is a conventional hard disk, tape drive or any conventional data storage device. The input/output ports 120 are also conventional, and can be arranged to input and output video signals, such as interlaced motion image signals (e.g., NTSC broadcast television format). Although it is understood that the computer may operate as a stand alone, the communications interfaces 122 allow the computer 100 to communicate with other computers on a local area network, other computers over the Internet, etc. Thus, the communications interfaces 122 can include a modem and/or network interface card for facilitating such communication.

The CPU 112, memory 114, display device 116, data storage device 118, input/output ports 120 and communications interfaces are arranged in a conventional computer architecture. The computer 100 can be a personal computer with an operating system and various applications, including the illustrated multimedia signal processing application 150. Alternatively, the computer 100 can be a dedicated video recorder, also including the functionality of the multimedia signal processing application 150, the image signal processing module 175 and its components, but not necessitating all of the devices and features ordinarily present with a personal computer. Various conventional architectures for processing image signals in a quality priority mode according to the functionality described herein will be recognized by the artisan.

The multimedia signal processing application 150 includes routines for processing audio and image signals. The application 150 includes a quality prioritizing module 180, a transform module 185, a quantification module 185, and a coding module 195. Although in this embodiment the application 150 is implemented as software, it is understood that the functionality of the application 150, including that of the various modules 180, 185, 190, 195, can be implemented in hardware, or a combination of hardware and software.

Figure 2:
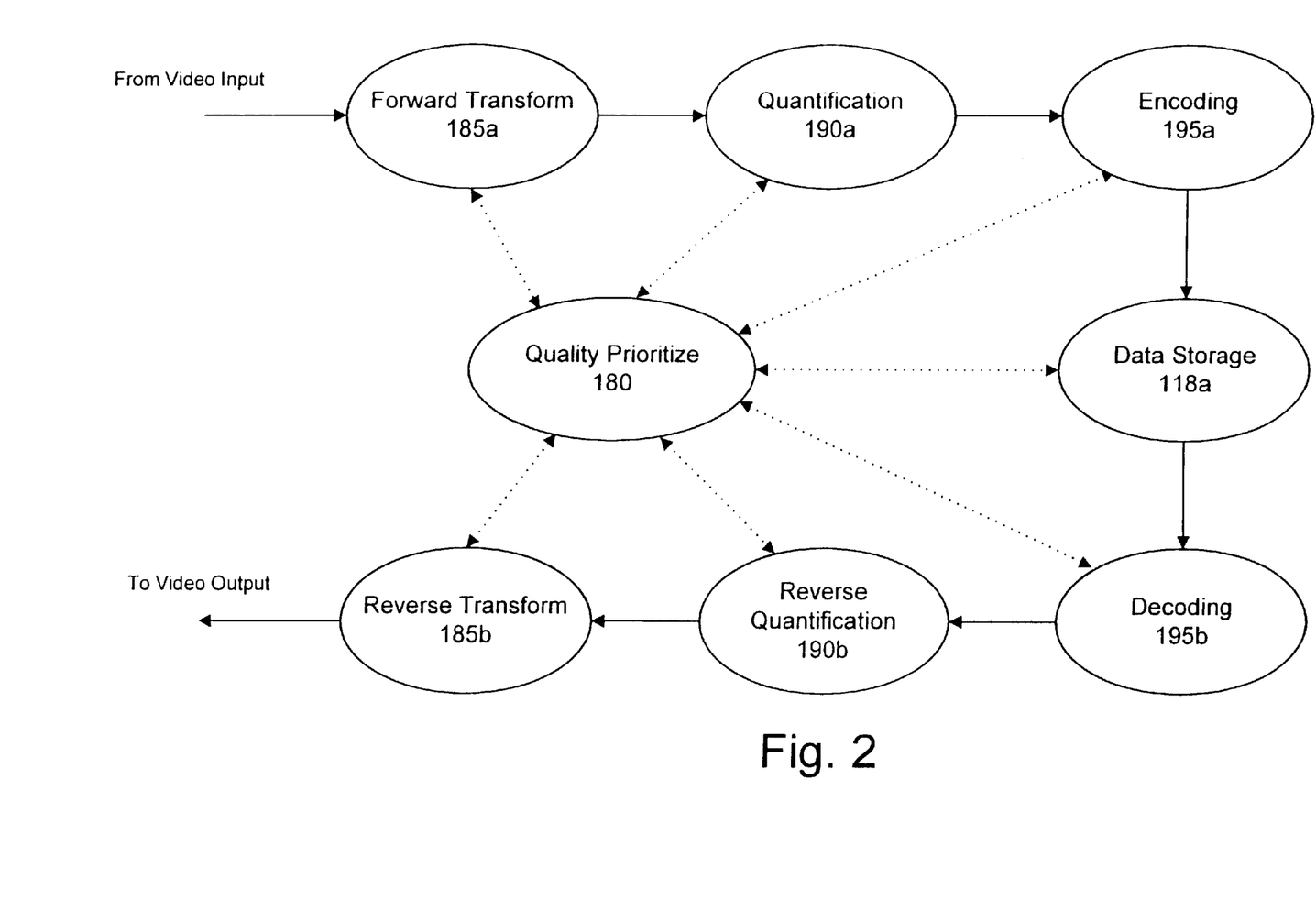
FIG. 2 is a flow diagram illustrating an embodiment of the functionality of the quality prioritizing module in accordance with the present invention.

Referring now to the flow diagram of FIG. 2 along with FIG. 1, a method of image signal processing performed by the image signal processing module 175 illustrates how a video signal can be input to, forward processed, stored (or transmitted in compressed form), reverse processed, and output from the computer 100. The flow diagram of FIG. 2 conceptually illustrates the flow of data and the operations performed on the data. The various modules 180, 185, 190, 195 in the image signal processing module 175 perform the operations, which are numbered accordingly. For example, the interlaced image processing module 180 performs the operations 180a, 180b shown in FIG. 2.

The signal originating from a video source (e.g. a conventional analog broadcast video signal), after some initial conventional processing, can be input to a conventional frame buffer (not shown), such as a FIFO. The frame buffer temporarily stores frames of image data. Multiple frames can be stored in each buffer so that the data available for processing does not become exhausted when one module processes faster than another.

As shown in FIG. 2, the digital image signal is subjected to a forward transform 185a, followed by quantification 190a, and encoding 195a. The transform module 185, quantification module 190 and coding module 195 implement conventional image processing techniques for the illustrated forward transform 185a, quantification 190a and encoding 195a operations. The forward transform 185a conditions the image signal for further processing. The illustrated transform 185a can include multiple transformations. One transform can be a bandsplit that subdivides the signal into plural regions which can be separately processed. For example, the forward transform 185a can apply a reversible transformation of the image signal that produces one or more subbands per dimension of space or time. A second transform can be used to remove image correlation, to allow for removal of redundant information so as to efficiently represent the image by reducing the overall data context.

Preferably, both of the described transform processes have a quantifiable worst case and RMS accuracy in the magnitude, phase and frequency domains, for use in conjunction with the quality prioritizing module 180. The various available transform alternatives will be recognized by the artisan. For optimized operation in conjunction with the quality prioritizing module 180, the selected transform operations 185a (as well as their corresponding reverse transforms 185b) should be exact, or should be (1) linear phase to avoid introduction of phase error, (2) interpolative to avoid introduction of subquanta discontinuity in the frequency spectrum, and (3) orthogonal within the resolution required by the specified quality to avoid localization of quantification noise energy.

The quantification operation 190a provides data values for the transformed image data according to the selected quantification scheme (e.g. 12-bit). The quantification operation 190a (and its inverse 190b) is preferably a scalar function that offers guaranteed worst case and RMS accuracy in the magnitude, phase and frequency domains for optimized performance in conjunction with the quality prioritizing module 180.

The encoding operation 195a provides encoded image data which is compressed for more efficient storage, transmission, or other processing. Preferably, a lossless entropy coder which supports a dynamic range adequate to meet the highest required DC resolution plus any required headroom to compensate for internal noise is used for the encoding operation 195a and the corresponding decoding operation 195b.

In one embodiment, the entropy coding module implements a parametric probability distribution function and a local sample of the data sample stream for effective real time encoding and decoding. The data probability distribution can be represented by a parametric probability distribution function as generally noted in equation 1.

$$p(s)=P[b,s] \qquad \text{(Eq. 1)}$$

where p(s) is the probability of symbol s, b is the free parameter, and

P[b,s] is a continuous function where b is a free parameter,

Additionally, the determination of the free parameter b as a function of the local sample of the data symbol stream can be as follows.

$$b(t)=B[s(t-1), s(t-2) \ldots s(t-n)], \qquad \text{(Eq. 2)}$$

where the free parameter at time t is approximated by the function B[s(t)] operating on the last n symbols, where n is reasonably small, preferably four.

These conditions can readily be met with extremely good results in encoder efficiency and minimal complexity. This technique bypasses the uncertainty of adaptive entropy coding in cases where the data stream symbol set represents a discrete version of some continuous function.

The preferred data probability distribution function is:

$$p(s) = P[s, b] = \frac{b^{|s|}}{N(b)} \qquad \text{(Eq. 3)}$$

where P[s,b] is the probability of symbol s, with the free parameter b controlling the base of the power function; and N[b] is a normalizing function to ensure that P sums to unity over the set s for any constant value of b.

The free parameter b characterizes the distribution. A local estimate of b is made using a function B[t] that approximates the local value of b at point t in the data stream. A preferred function which works well over a very broad range of image types is a short term weighted average of the magnitudes represented by the symbols.

$$ws = \sum_{1}^{n} \frac{|s(t-n)|}{n}, \quad \text{and} \qquad \text{(Eq. 4)}$$

$$B[t]=M[ws] \qquad \text{(Eq. 5)}$$

where B[t] is "b" approximated at time t; s(t) is the value of the symbols at time t, yielding a locality of four weighted most heavily upon the immediately previous symbol; ws is the weighted sum; M is a discrete mapping function linking the weighted sum to "b"; and n is the number of symbols included in the weighted sum.

When the probability that the symbol "s" is zero is very near one (p[0]~1), the value of this weighted sum will typically be zero. In this case the free parameter "b" must become a function of a larger region to increase resolution. Due to the nature of the distribution and characterization function in this case, B[t] can be accurately approximated using a discrete mapping function of the count of consecutive zero symbols.

B[t] can thus respond rapidly to changes in the local entropy of a data stream. When the local entropy is larger than 1 bit, response is typically on the order of one sample. When the local entropy is smaller than 1 bit, response follows the limit imposed by the uncertainty principle.

Once the discrete quantifications for b are determined, the representative probability distribution P[s,b] is calculated and a secondary coding system for that distribution is defined. The secondary coding system can be a Huffman code or other conventional coding system. With quantification of b, the average error in b is approximately quantification/π, so Huffman codes which are minimum for a specific distribution do not necessarily perform as well as codes which are more robust over the probability range which they will cover. For example, Elias codes, which offer robust performance over extended ranges, can be used instead of Huffman codes.

For probability distributions where p[0]>0.5, the number of zero value symbols represented by the 0 code value is determined by 1/p[0]. When a non zero value is encoded, it is then followed by a codeword giving the count of any encoded zeros which preceded the nonzero value. This is necessary because the 0 code only represents certain discrete quantities of zero values (1/p[0]), meaning that some number of zero data values may have been awaiting encoding when the nonzero value appeared. The number of bits in the codeword providing the number of unencoded zero values is ceiling [Log2[1/p[0]]], selected to allow the largest possible number of unencoded zeros be represented.

Further description of an entropy coder is provided in provisional patent application Ser. No. 60/052,144, filed by Kenbe Goertzen on Jun. 9, 1997, entitled Apparatus and Method for Entropy Coding.

Various operations can be performed using the compressed image signal data produced by forward interlaced image processing 180a, transformation 185a, quantification 190a and encoding 195a. The encoded image signal data can be stored 118a in a data storage device 118 such as a hard disk. The encoded image signal data can also be transmitted, such as from one computer to another over a LAN, a modem, or the Internet, or otherwise. The encoded image signal data can also be processed (e.g., stored 118a) simultaneous to its display on the conventional display device 116 or through a conventional video output port 120.

Thus, a video signal can be input to the computer 100, and after conventional conditioning, it is subject to a forward transform 185a, quantification 190a, encoding 195a and, storage 118a (or transmission, etc.) as described above. Additionally, the forward transform 185a and quantification 190a operations provide determinable average and worst case error criteria, as described above. The quality prioritizing module 180 includes routines for determining the image signal quality that would result when the input image signal is subject to the forward transform 185a and quantification 190a according to their current settings. Thus, a given forward transform 185a and quantification 190a scheme may transform the image signal to provide a number of regions, each region comprising a number of samples (e.g., 128×128), with each sample having a data size (e.g., 10 bits). Also, that given scheme will encode an image signal and allow reproduction of that image signal (by reverse processes (185b, 190b, 195b) at a determinable quality level which is ascertained by the quality prioritizing module 180 based upon the current settings. Based upon the regions, symbol parameters (samples, size), and maximum entropy introduced by the encoding scheme, a peak data rate for the determinable quality level is also determined by the quality prioritizing module 180, which can compare the available system resources (i.e., the image signal data servicing rate)

to the peak data rate to ensure the selected quality level. Furthermore, since the error in the system is predictable, it can be modeled for real time quality prioritization.

While the maximum entropy is incorporated into a determination of the peak data rate and corresponding determination of whether the image signal processing parameters are allowable to guarantee the selected quality level, the typical image signal stream is encoded with substantially greater efficiency, according to the entropy coding scheme described above, as well as any redundancy removed by transformation and filtering. Thus, image signal quality is guaranteed, and processing overhead is minimized.

Figure 3:
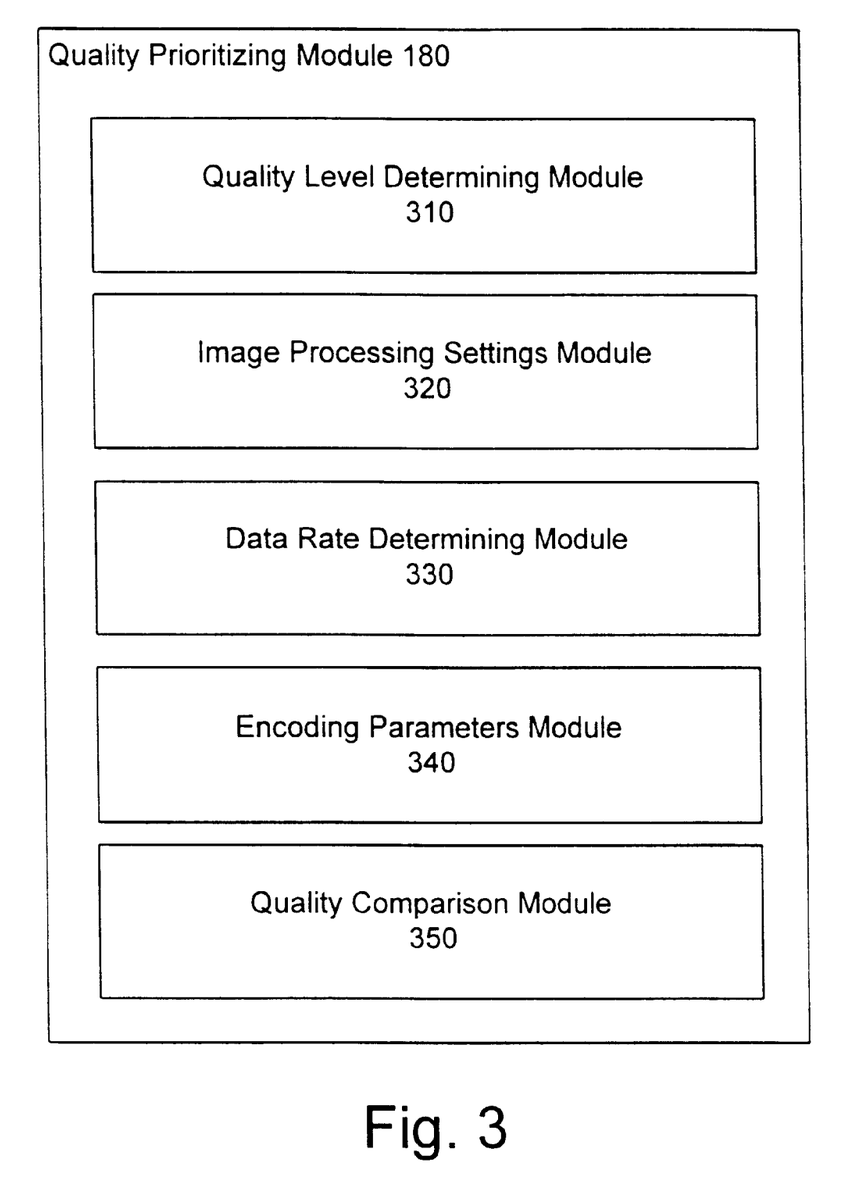
FIG. 3 is a block diagram illustrating an embodiment of a quality prioritizing module constructed in accordance with the present invention.

Referring now to the block diagram of FIG. 3, an embodiment of a quality prioritizing module 180 in accordance with the present invention includes a quality level determining module 310, an image processing settings module 320, a data rate determining module 330, an encoding parameters module 340, and a quality comparison module 350.

The quality comparison module 350 receives the selected or desired quality level. This quality level can be preset or input to the system by a user. Preferably, the quality level is input according to the typical sample domain criteria. For example, n bit, absolute error bound, and peak signal to noise ratio criteria can be input as the desired quality level. The quality comparison module 350 compares this selected quality level with that indicated by the quality level determining module 310, which determines the current quality level based upon the current image processing settings found in the image processing settings module 320. Specifically, the quality level determining module 310 includes routines for determining the amount of error introduced by the transform and quantification processes described above. Of course, if additional filtering or other operations are in the chain of forward image signal processing, the quality level determining module 310 incorporates the error that is introduced by those additional operations into its error and signal quality determinations.

As described above, the transform and quantification processes will produce image data for a plurality of regions. Each of these regions will have a sample count and resolution per sample (i.e., data size). These values are provided in the image processing settings module 320. The encoding parameters module 340 is in communication with the coding module 195 and the image processing settings module 320. Based upon the current image processing settings, the encoding parameters module 340 determines the entropy coder data size at minimum entropy (Ez) and the entropy coder data size at maximum entropy (Em). Since different regions can have different resolutions, these values can be stored in an array indexed to regional resolution, or region.

The data rate determining module 330 includes routines for determining the required data rate to produce the selected quality level and corresponding regional resolutions. This is preferably determined by the maximum data content according to the current image processing settings, as well as the image processing rate (e.g., the number of images per second IPS).

Quality is prioritized by ensuring that the available data rate exceeds the required peak data rate for the current image processing settings. Any conventional exact data storage and recall system with adequate sustained data rates will work for quality priority. The actual data rate is a function of the original image information content, entropy coder efficiency, and the efficiency of any de-correlation transform at removing redundancy from the sample domain representation.

Table I illustrates the information used by the data rate determining module 330 to determine the peak data rate.

TABLE I

| | |
|---|---|
| Number of Regions | = R |
| Region indicator | = r |
| Entropy coder data size at maximum entropy for region | = Em [Red[r]] |
| Entropy coder data size at minimum entropy | = Ez |
| An array of the resolutions for regions | = Res[r] |
| An array of the sample count in regions | = C[r] |
| Images Per Second | = IPS |
| Peak Data Rate (in Bits per second) | = PDR |

The number of regions R is a value corresponding to the functionality of the transform module 185. Similarly, the entropy coder data sizes correspond to the functionality of the coding module 195, which requires a determinable maximum overhead. The region indicator r is an independent variable corresponding to the number, of regions R, and the array of resolutions and sample counts is provided by the image processing settings module 320, as described above. The value IPS will vary as desired, and will typically correspond to the rate used in a conventional image processing scheme. The data rate determining module 330 determines a peak data rate PDR based upon the noted values.

The example of a 1K×1K monochrome image at 10 bit nominal resolution processed at 30 frames per second can be used to illustrate a typical data rate in a sample domain image processing versus a quality priority image processing scheme. In the sample domain, the rate would be calculated as shown in Equations 6–8 below.

$$PDR=Res[0]*C[0]*IPS \quad\quad (Eq.\ 6)$$

$$C[0]=1024\times1024\ Res\ [0]-10.0\ Bits \quad\quad (Eq.\ 7)$$

$$Rate=1.25\ MBytes*IPS\ 37.25\ Megabytes\ per\ second \quad\quad (Eq.\ 8)$$

In quality priority operation, the peak rate is a function of the data size at maximum entropy for each of plural regions as shown in Eq. 9 below. The peak data rate can be determined as a summation of the entropy coder data size at maximum entropy times the sample count for each region, multiplied by the number of images per second.

$$PDR=Sum[Em[Res[r]]*C[r]\ \{r,\ 0,\ R-1\}]*IPS \quad\quad (Eq.\ 9)$$

Preferably the image signal processing scheme precompensates the image to the desired frequency resolution and implements a transform that is either (1) exact or (2) (a) linear phase, (b) interpolative, and (c) practically orthogonal. This allows the resolution to be determined based upon the regional symbol parameters, such as the sample count and resolution for each region. The preferred entropy coder provides predictable minimum and maximum entropy values according to its characteristics. The entropy coding scheme described above can be configured for an Ez of 1/4096 and Em of 1 bit (i.e., the maximum amount of overhead). Table II illustrates a scheme that implements a 2D separable subband transform, and the described entropy coding scheme having 1 bit of overhead.

TABLE II

| Region | r | C[r] | Res[r] | Em[Res[r]] | Max Bits |
|---|---|---|---|---|---|
| LLL | 0 | 128 × 128 | 12.0 | 13.0 | 212,992 |
| LLH | 1 | 128 × 128 | 11.5 | 12.5 | 204,800 |
| LLV | 2 | 128 × 128 | 11.5 | 12.5 | 204,800 |
| LLD | 3 | 128 × 128 | 11.0 | 12.0 | 196,608 |

TABLE II-continued

| Region | r | C[r] | Res[r] | Em[Res[r]] | Max Bits |
|---|---|---|---|---|---|
| LH | 4 | 256 × 256 | 10.5 | 11.5 | 753,664 |
| LV | 5 | 256 × 256 | 10.5 | 11.5 | 753,664 |
| LD | 6 | 256 × 256 | 10.0 | 11.0 | 720,896 |
| H | 7 | 512 × 512 | 9.5 | 10.5 | 2,752,512 |
| V | 8 | 512 × 512 | 9.5 | 10.5 | 2,752,512 |
| D | 9 | 512 × 512 | 9.0 | 10.0 | 2,621,440 |

The above values indicate a maximum of 11,173,880 bits per frame. The maximum data rate per second would be 1.33 MBytes×30 IPS=40.0 MBytes per second. Although this would be the peak rate, the typical rate (at typical entropy, which would provide approximately 2 bits of information per pixel) would be only about 7.5 MBytes per second, and the minimum rate (minimum entropy) would be approximately 256 Bytes×30=0.007 MBytes per second. Both of these rates are substantially below the sample domain scheme, which requires a substantially constant high data rate to provide a given quality level, and which is directly limited by the system throughput.

The described entropy coding scheme quickly adapts to local fluctuations. This means that any high bandwidth demands are likely to be of limited duration. Thus, relatively simplistic solutions, such as frame buffering, can accommodate short term high data processing requirements, while high quality is guaranteed and processed using less sophisticated equipment than would be required to meet the same quality in a sample domain system.

Another example is shown in Table III, which illustrates values for an example of a 2D nonseparable subband system.

TABLE III

| Region | r | C[r] | Res[r] | Em[Res[r]] | Max Bits |
|---|---|---|---|---|---|
| LLL | 0 | 128 × 128 | 12.0 | 13.0 | 212,992 |
| LLM | 1 | 256 × 256/4 | 11.5 | 12.5 | 204,800 |
| LLD | 2 | 256 × 256/2 | 11.0 | 12.0 | 393,216 |
| LM | 3 | 512 × 512/4 | 10.5 | 11.5 | 753,664 |
| LD | 4 | 512 × 512/2 | 10.0 | 11.0 | 1,441,792 |
| M | 5 | 1K × 1K/4 | 9.5 | 10.5 | 2,752,512 |
| D | 6 | 1K × 1K/2 | 9.0 | 10.0 | 5,242,880 |

For this scheme, the maximum number of bits per frame is 11,001,856; the maximum data rate is 39.35 MBytes per second (1.31 MBytes×30); the typical data rate is 7.50 MBytes per second; and the minimum data rate is 0.007 MBytes per second (256 Bytes×30).

Therefore, at the cost of a potentially larger maximum size in the rare case of a fully modulated maximum amplitude image, the typical size can be reduced substantially. As more potential auto-correlation (or under-modulation) in the image is taken advantage of by additional band-splitting either in space or time, the maximum size increases because more and more resolution is required for the low frequency components. At the same time, as more potential auto-correlation is removed, the typical size decreases. This is accomplished without the addition of high frequency noise.

Figure 4:
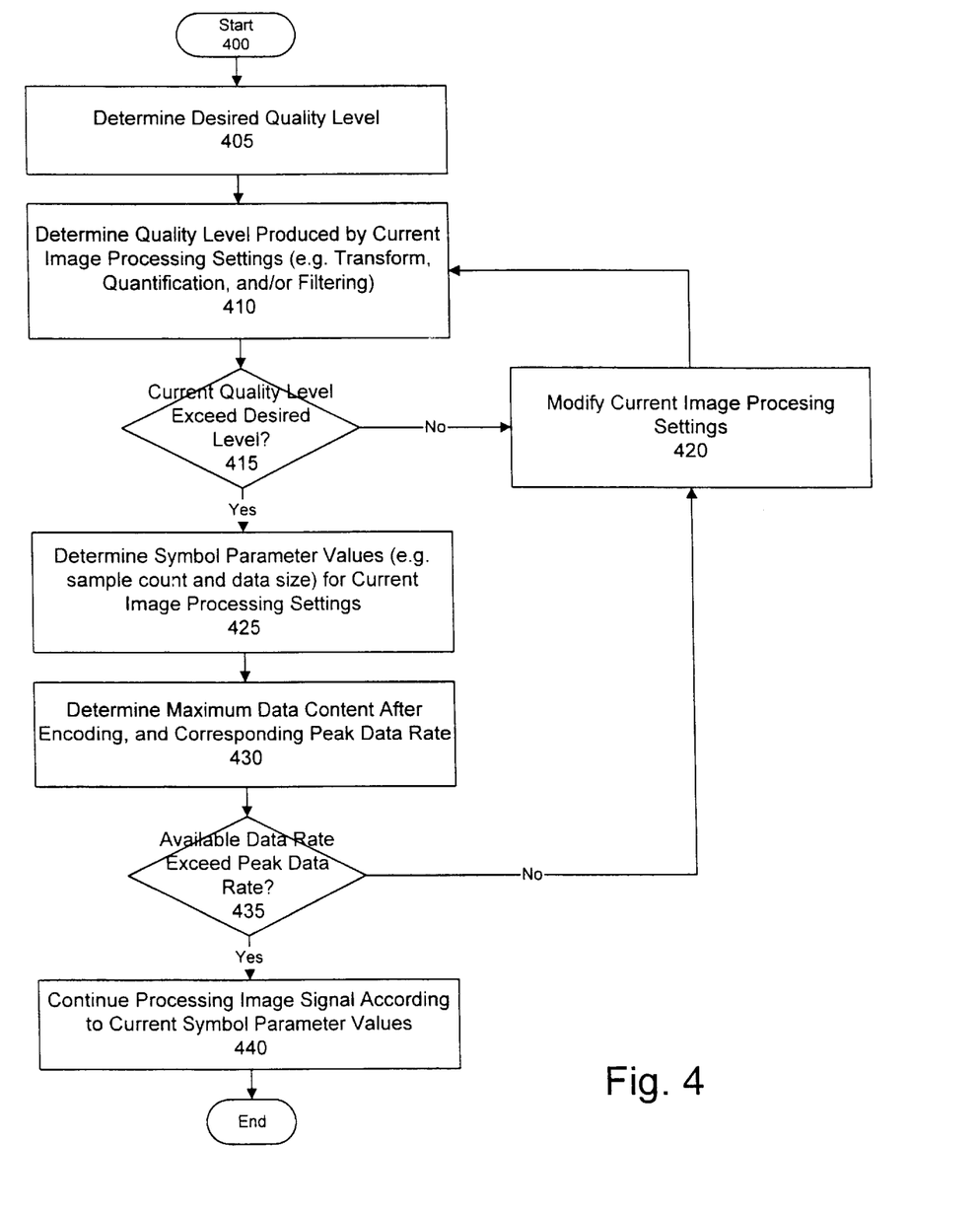
FIG. 4 is a flow diagram illustrating an embodiment of a method for quality priority image signal processing in accordance with the present invention.

Referring now to the flow diagram of FIG. 4, an embodiment of a method 400 for quality priority image signal processing in accordance with the present invention determines, in step 405, a desired minimum quality level. This level can be a predetermined value or a value input by the user. Then, in step 410, the quality level produced by the current image signal processing settings is determined. The image processing settings are those produced by the current transform, quantification, and (if provided) filtering steps of image processing. Thus, for example, transformation and quantification can receive an image signal and produce a plurality of subband regions each having a sample count and data size. For example, as shown in Table III, a 2D nonseparable subband split can produce seven subband regions (r), with various sample counts (C[r]) and resolutions (Res [r]) as desired. The image processing settings module 330 provides the current image processing settings, and the quality level determining module 310 uses those settings to determine the current quality level.

The determined current quality level is compared to the desired quality level in step 415 to ascertain whether the current quality level is acceptable in light of the desired quality level. This can be a straight comparison, since the desired quality level and current quality level are preferably provided according to the same scale, such as sample domain peak signal to noise. If the current quality level is adequate, then the method continues in step 425. If the current quality level is inadequate, then the current image processing settings are modified in step 420 to change the quality level. This can be done by the image processing settings module 320 in conjunction with the quality level determining module 310, such as by iteratively incrementing the sample count or data size for one or more regions and determining the corresponding quality level until a quality level threshold (such as the desired quality level) is surpassed.

In step 425, the symbol parameter values (e.g. sample count and data size) produced by the current image processing settings are determined, and in step 430, these values are used to determine the maximum data content after encoding and corresponding peak data rate. The symbol parameter values are provided based upon the current transformation and quantification settings as described above. The entropy coding scheme used for encoding determines the maximum data content. Thus, encoding that produces 1 bit of maximum overhead produces a maximum data content as a function of the unencoded data content and the overhead. The peak data rate is then determined based upon the maximum data content and the image processing rate (e.g., IPS). The data rate determining module 340, in communication with the encoding parameters module 350 and image processing settings module 330 performs these steps 425, 430.

A comparison of the peak data rate to the available data rate, in step 435, is then made to determine whether to continue processing the image signal according to the current image processing settings (step 440), or to modify the current image processing settings to ensure that the image signal is processed according to the minimum quality level. The settings modification can decrement the sample count and/or data size to lower the data content and corresponding peak data rate to ensure that the available data rate is adequate. Buffering, such as a FIFO frame buffer, can also be used to accommodate short term high data content regions without immediately modifying the image processing settings to guarantee the selected quality level.

I claim:

1. A method for quality priority processing of an input image signal, the method comprising:
   determining a desired quality level for processing the input image signal;
   confirming that current settings for processing the input image signal produce a quality level at least equal to the desired quality level;
   determining symbol parameters for each of a plurality of subband regions produced from the input image signal according to the current settings;

determining a maximum data content required to represent the input image signal based upon the symbol parameters and an amount of overhead introduced by encoding;

determining a peak data rate corresponding to the maximum data content; and confirming that an available data processing rate is at least equal to the peak data rate.

2. The method of claim 1, wherein the symbol parameters comprise a symbol count and symbol data size.

3. The method of claim 2, wherein the current settings comprise the settings for transforming and quantifying the input image signal.

4. The method of claim 3, further comprising:

modifying the current settings where it is determined that the input image signal will not be processed at a quality level at least equal to the desired quality level.

5. The method of claim 3, further comprising:

modifying the current settings where it is determined that the peak data rate exceeds the available data processing rate.

6. An apparatus for quality priority processing of an input image signal, the apparatus comprising:

a quality level determining module, for determining a desired quality level for processing the input image signal;

a quality comparison module, in communication with the quality level determining module, for confirming that current settings for processing the input image signal produce a quality level at least equal to the desired quality level;

an image processing settings module, for determining symbol parameters for each of a plurality of subband regions produced from the input image signal according to the current settings; and a data rate determining module, in communication with the image processing settings module, for determining a maximum data content required to represent the input image signal based upon the symbol parameters and an amount of overhead introduced by encoding, for determining a peak data rate corresponding to the maximum data content, and for confirming that an available data processing rate is at least equal to the peak data rate.

7. The apparatus of claim 6, wherein the symbol parameters comprise the symbol count and symbol data size.

8. The apparatus of claim 7, wherein the current settings comprise the settings for transforming and quantifying the input image signal.

* * * * *